United States Patent [19]

Katsof et al.

[11] 4,187,015
[45] Feb. 5, 1980

[54] CAMERA SYSTEM

[75] Inventors: Barry Katsof, Montreal; Joel Matlin, Dollard-des-Ormeaux, both of Canada

[73] Assignee: Camtron Electronics International Ltd., St. Laurent, Canada

[21] Appl. No.: 852,679

[22] Filed: Nov. 18, 1977

[51] Int. Cl.² ............................................. G03B 17/24
[52] U.S. Cl. .................................................... 354/109
[58] Field of Search ............... 354/83, 89, 103, 110, 354/109, 105, 114, 118, 119, 120, 269; 355/60, 66, 57

[56] References Cited

U.S. PATENT DOCUMENTS

| | | | |
|---|---|---|---|
| 1,494,724 | 5/1924 | Verschraeghen | 354/109 |
| 1,645,590 | 10/1927 | Ernst | 354/109 |
| 2,368,970 | 2/1945 | Cook | 354/109 |
| 2,800,842 | 7/1957 | Albrecht | 354/110 |
| 2,896,522 | 7/1959 | Stein | 354/109 |
| 2,916,977 | 12/1959 | St. George | 354/109 |
| 3,380,337 | 4/1968 | Dacquay | 355/60 |
| 3,398,638 | 8/1968 | Frohlich | 355/60 |
| 3,928,863 | 12/1975 | Stewart et al. | 354/109 |
| 3,959,803 | 5/1976 | Marvel | 354/105 |
| 3,981,582 | 9/1976 | Bookless | 354/105 X |

Primary Examiner—Donald A. Griffin
Attorney, Agent, or Firm—Alan Swabey; Robert Mitchell; Melvin Sher

[57] ABSTRACT

The invention relates to a system for simultaneously photographing two objects on a single instant film. Such systems are used in, for example financial institutions such as banks for simultaneously photographing a transaction document, such as a cheque, and the person related to the document, such as the person cashing the cheque. In accordance with the present invention, the camera of the system includes two separate lenses, each one receiving light rays bearing the image of a different one of the objects. Associated with each lens is a separate shutter mechanism, and the f opening or the shutter speed of each shutter is separately adjustable by means which are readily accessible to the camera operator. Thus, the shutters can be separately adjusted to take into account the different lighting conditions to which the separate objects are exposed.

24 Claims, 3 Drawing Figures

CAMERA SYSTEM

BACKGROUND OF THE INVENTION

1. Field of the Invention

This invention relates to a system for simultaneously photographing two objects on an instant film. More specifically, this invention relates to such a system employing two separate lenses, and separate means associated with each said lens for separately adjusting conditions at each said lens.

2. Statement of the Prior Art

In the development of the art, there were designed cameras for taking two pictures of one object at the same time, namely, a positive and a negative, such as described in U.S. Pat. No. 2,018,891, Kean, issued Oct. 29, 1935 and U.S. Pat. No. 3,608,456, Hauser, issued Sept. 28, 1971. Such teachings are of interest herein in that they may employ two separate lenses.

U.S. Pat. No. 3,345,924, Kitrosser, issued Oct. 10, 1967, teaches a camera wherein 1,2 or 4 pictures of the same object can be produced.

There were then developed cameras for producing images of two separate objects on one film (the above cameras produced one image on two or more different films) such as U.S. Pat. No. 3,628,430, Morse, issued Dec. 21, 1971, U.S. Pat. No. 2,827,832, Patterson et al, issued Mar. 25, 1958 and Canadian Pat. No. 987,157, Roger et al issued Apr. 13, 1976. This is accomplished, basically, by directing rays from one object to one portion of the camera lens, and by directing rays from the other object to a different portion of the same lens. When the shutter is opened, light from one portion of the lens is directed to a corresponding portion of the film and light from the other portion of the lens is directed to a second portion of the film, so that the film is exposed with rays of light eminating from the two different objects, and the two objects are photographically reproduced on the film. In these systems, only one lens is used.

The problem with the latter type of system is that the two different objects are at different distances from the one lens, and that they are also exposed to different lighting conditions. Thus, when one of the objects is in focus, the other isn't, and when the f opening is sufficient for one object, it is not right for the other. Thus, while one of the objects may be clearly reproduced, the other will be blurred. And when one of the objects is correctly exposed, the other will be over or under exposed. Usually, a compromise position vis-à-vis both focus and f opening is used, so that the photographic reproduction of both objects is blurred and over and/or under-exposed.

The next step was in the development of systems using two separate lenses. In these systems, as for example illustrated in U.S. Pat. No. 3,631,773, Moodle, issued Jan. 4, 1972, U.S. Pat. No. 3,928,863, Stewart et al, issued Dec. 23, 1975 and U.S. Pat. No. 4,011,570, Stievemart et al, issued Mar. 8, 1977, light from one of the objects is directed to one of the lenses and light from the other object to the other lens. The lenses then direct their respective light rays to different portions of the film. Usually, light from at least one of the objects is directed to its respective lens by way of a system of mirrors. With these systems, there is only one shutter for both lenses. To the extent that the distance from each object to its respective lens can be kept constant, the problem of focus is overcome with such systems. However as is well known, such systems are used largely in financial institutions such as banks for the purpose of obtaining, on one film and thus in one photograph, a picture of the documentation of a transaction, such as a check, and the person conducting the transaction, i.e., the person cashing the check. Because these persons are of different heights and different temperaments having regards to their co-operativeness, the possibility of having all of them at a constant distance is not at all guaranteed.

In any case, both objects will be exposed to different lighting conditions so that the possibility of over or under exposure of one portion of the film when the other is correctly exposed is a problem in such systems. This problem is recognized in the above-mentioned patents, and their solution to the problem is to provide an internal lighting source which provides uniform light to the entire film at the moment of exposure. While this provides a partial solution to the problem, it introduces problems of its own. Thus, the cost of the installation is high, and there is no external indication of the failure of the bulb which provides the internal lighting so that the camera could be used for some time without the internal lighting when the bulb has failed. In addition it is inconvenient to have to replace the failed bulb, and in some systems, this requires a factory repair.

The approach of the prior art has been to provide a non-adjustable camera for this purpose as it was understandably reluctant to complicate the picture taking procedures by requiring adjustments of the camera. However, because of this approach, problems remain outstanding.

SUMMARY OF THE INVENTION

In accordance with the invention, there is provided a system comprising two lenses, and a separate shutter associated with each of said lenses.

There is further provided, in accordance with a feature of the invention, adjustment means for each of said lenses, said adjustment means being disposed to be accessible to a system operator.

In accordance with a specific embodiment there is provided, in accordance with the invention, in a system for simultaneously photographically reproducing, on an instant film, the images of two separate objects, a camera box comprising; a first and second chamber disposed in side by side relationship within said camera box; a first lens associated with said first chamber; a second lens associated with said second chamber; a first shutter associated with said first lens and having adjustment means and first means operatively connected to said adjustment means of said first shutter; a second shutter associated with said second lens and having adjustment means and second means operatively connected to said adjustment means of said second shutter; said first and second means being disposed to be readily accessible to an operator of said camera.

The invention also relates to, in a system for simultaneously photographically reproducing, on an instant film, the images of two separate objects, a camera box comprising; a first side wall, a second side wall and a separating wall between said first and second side walls; a top wall and a bottom wall, said separating wall, a portion of first side wall, a first portion of said top wall and a first portion of said bottom wall defining a first chamber within said camera box; said separating wall, a portion of said second side wall, a second portion of said top wall and a second portion of said bottom wall defining a second chamber within said camera box; a first lens associated with said first chamber; a second lens associated with said second chamber; a first shutter associated with said first lens and having adjustment means and first means operatively connected to said adjustment means of said first shutter; a second shutter associated with said second lens and having adjustment means and second means operatively connected to said adjustment means of said second shutter; said first and second means being disposed to be readily accessible to an operator of said camera.

From a different aspect, the invention relates to a system for simultaneously photographically reproducing, on an instant film, the images of two separate objects comprising; a frame including a base and an elongated member extending vertically upwardly from said base; a camera box mounted on said elongated member above said base; said camera box comprising; a first lens associated with said first chamber; a second lens associated with said second chamber; a first shutter associated with said first lens and having adjustment means and first means operatively connected to said adjustment means of said first shutter; a second shutter associated with said second lens and having adjustment means and second means operatively connected to said adjustment means of said second shutter; said first and second means being disposed to be readily accessible to an operator of said camera; an extension housing extending outwardly from a side wall of said camera box and adjacent to an aperture in said side wall, said housing being disposed directly over and in line with a portion of said base.

The invention also relates to a system for simultaneously photographically reproducing, on an instant film, the images of two separate objects comprising; a frame including a base and an elongated member extending upwardly from said base; a camera box mounted on said elongated member above said base; said camera box comprising; a first side wall, a second side wall and a separating wall between said first and second side walls; a top wall and a bottom wall; said separating wall, a portion of said first side wall, a first portion of said top wall and a first portion of said bottom wall defining a first chamber within said camera box; said separating wall, a portion of said second side wall, a second portion of said top wall and a second portion of said bottom wall defining a second chamber within said camera box; a first lens associated with said first chamber; a second lens associated with said second chamber; a first shutter associated with said first lens and having adjustment means and first means operatively connected to said adjustment means of said first shutter means; a second shutter associated with said second lens and having adjustment means and second means operatively connected to said adjustment means of said second shutter; said first and second means being disposed to be readily accessible to an operator of said camera; an extension housing extending outwardly from a side wall of said camera box and adjacent to an aperture in said side wall; said housing being disposed directly over and in line with a portion of said base.

BRIEF DESCRIPTION OF THE DRAWINGS

The invention will be better understood by an examination of the following description, together with the accompanying drawings, in which.

DETAILED DESCRIPTION OF THE DRAWINGS

Figure 1:
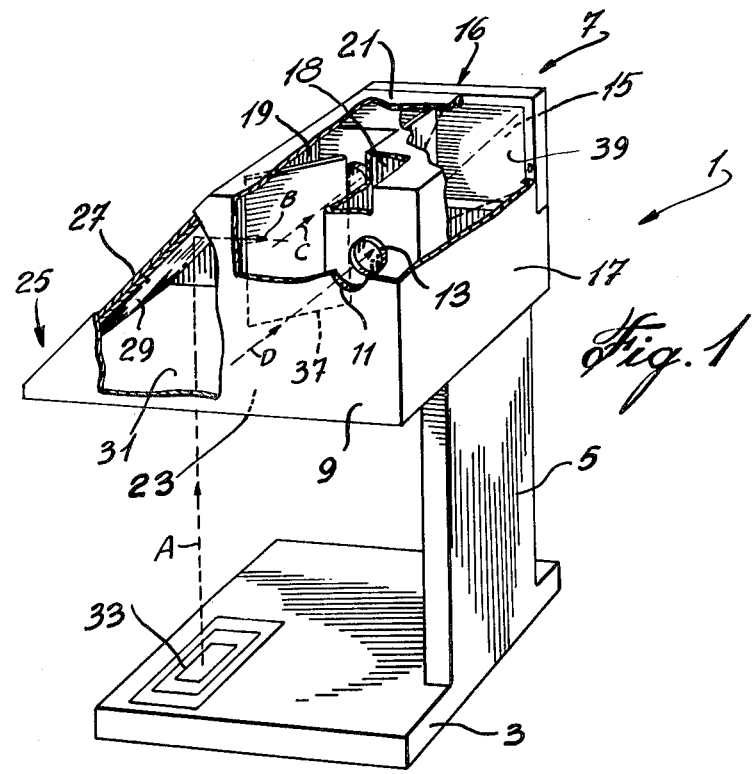
FIG. 1 is a perspective view of the system in accordance with the invention with sections being partially broken away.

Referring now to the drawings, the system is indicated generally at 1 in FIG. 1 and it includes a frame having a base 3 and an elongated member 5 extending vertically upward from the base. Mounted on the elongated member above the base is a camera box 7 having a front wall 9 with an aperture 11 therein. Disposed in the camera box and in line with the aperture 11 is a first lens 13.

The camera box also includes a back wall 15, side walls 17 and 19, a top wall 21 and bottom wall 23. The back wall includes an instant film cassette receiving means 16 which includes a back door 16a openable to receive a film cassette. The front of the means 16 is, of course, open so that film in the cassette will be exposed to light in the camera box. Thus, the box must be made completely light tight and impervious to any light except the light bearing the images of the objects to be photographed. Although other means are usable here, preferably the means 16 comprises a Polaroid TM pack. Extending from side wall 19 of the camera box is extension housing 25 disposed adjacent aperture 20 in the side wall. The extension housing includes a top wall 27 which extends downwardly from and at an angle to top wall 21 of the camera. Preferably, wall 27 extends at an angle of 45 degrees to wall 21. The inner surface of the top wall 27 comprises a mirror 29. Preferably, the entire inner surface of top wall 27 is covered by the mirror 29. The housing also includes an aperture 31 at the bottom surface, thereof and preferably the aperture 31 is glass covered. As seen in FIG. 1, the housing aperture 31 is directly over and in line with a portion, 33, of the base 3. The portion 33 can contain lines to aid in the placement of transaction documents thereon as will be discussed below.

Figure 2:
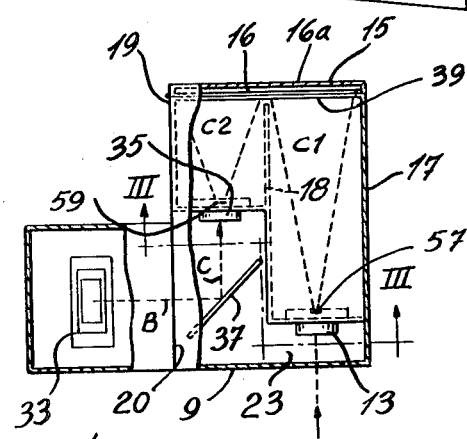
FIG. 2 is a top view of the camera with the top removed.

Disposed internally of the camera box between side walls 17 and 19 is a separating wall 18. The separating wall separates two side by side chambers C1 and C2 seen in FIG. 2. Chamber C1 is defined by the separating wall 18, a portion of side wall 17, a portion of top wall 21 and a portion of bottom wall 23, while chamber C2 is defined by the separating wall 18, different portions of the top and bottom walls 21 and 23 respectively, and a portion of side wall 19. Lens 13 is associated with chamber C1, while a second lens 35 is associated with chamber C2. The front and back walls and the two lenses are disposed in parallel planes.

Disposed in the camera box, between chamber C2 and the front wall is a second mirror 37 positioned to receive reflections from mirror 29 and to direct them to the lens 35. As seen in FIG. 1, mirror 37 is in a vertically upright plane which is at an angle to the side wall 19. Preferably, the angle between the plane of the second mirror and the side wall 19 is 45 degrees.

Figure 3:
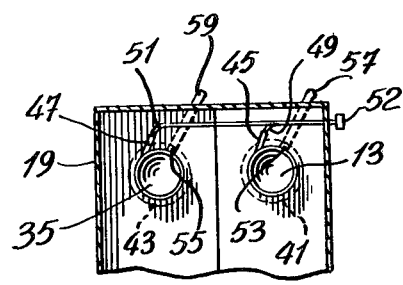
FIG. 3 is a section through 111—111 of FIG. 2.

Turning now to FIG. 3, associated with lens 13 is a shutter mechanism 41, and associated with lens 35 is a shutter mechanism 43. The methods of mounting lens with associated shutter mechanisms is well known in the art and requires no further description here.

Each shutter mechanism includes a cable release attachment, 45 and 47, respectively, for opening the shutters. To insure that both shutters open at the same time, cables 49 and 51 are connected to cable release mechanisms 45 and 47 respectively at one end of the cables. The other ends of the cables are connected to a single common switch 52.

Each shutter mechanism also includes adjustment means 53 and 55 respectively, wich are operative to adjust either the f opening or the shutter speed of each shutter, as well known in the art. Levers 57 and 59 are operatively connected to adjustment means 53 and 55 respectively, and levers 57 and 59 extend outside of the camera box, whereby to make the adjustment means readily accessible to an operator of the camera.

In a preferred embodiment, the levers are attached to the shutter speed adjustment means. The f openings are set by factory adjustment and remain constant at the operator's station. It will be appreciated that the levers, or other means (as discussed below) could be attached to the f opening adjustment means, in which case the shutter speed would be set to remain constant. It is, of course, well known that either the shutter speed or the f opening can be adjusted to accommodate different lighting conditions.

As shown in FIG. 3 of the drawings, the lever means extend out of the camera box through the top surface thereof. It will be appreciated that these levers could extend through a different surface of the camera box. In addition, means other than the levers could be employed for this purpose. Thus, the adjustment means could be motor driven, and switches for starting and stopping the motors could be located on an outer surface of the camera box. Alternatively, the adjustment means could be operatively connected to rotating means through gear trains, and the rotating means would be disposed to be easily accessible to the operator. The only requirement is that it be possible for the operator to adjust the shutters through means easily accessible to the operator which means are operatively connected to the shutter adjustment means.

Although the switch 52 is shown mounted on a side wall of the camera box, it will, of course, be appreciated that the switch can be located in any position convenient to the operator.

In operation, the system will normally be used to produce a single photograph containing the image of both a transaction document, such as a check and the image of the person with whom the transaction document is associated, such as the person cashing the check. A film cassette is first loaded in means 16 and the transaction document is disposed on the portion 33 of the base 3. The person is stationed in front of the camera so that his head and shoulders are in line with the aperture 11 in the camera box. Levers 57 and 59 are then adjusted by the operator to adjust the individual shutter mechanisms taking into account the different lighting conditions the different objects are exposed to. When the shutters have been properly adjusted, switch 52 is depressed to momentarily and simultaneously open both shutters.

Light rays A, carrying the image of the transaction document, are directed at the mirror 27, and light rays B, carrying the reflection of mirror 27, are directed at mirror 37. Light rays C, carrying the reflection of mirror 37, are directed at the lens 35. Light rays D, carrying the image of the person, are directed directly at the lens 13.

When the shutters are opened, lens 13 focuses the image of the person on the right hand side (as shown in dotted lines in FIG. 2) of the film 39, and lens 35 focuses the image of the transaction document on the left hand side of the film (as also shown in dotted lines). Thus, the photograph made from the exposed and processed film will carry an image of both the person and the transaction document. Because two lenses are used, both images will be clear. Because there is a separate shutter for each lens, and because each shutter is separately adjustable, both images will be properly exposed.

It will be appreciated that wider or narrower transaction document can be accommodated by changing the angle of the top wall 27. However, as such change could require a repositioning of the mirror 37, this would have to be a factory adjustment.

We claim:

1. In a system for simultaneously photographically reproducing, on an instant film the images of two separate objects, a camera box comprising;
  a first and second chamber disposed in side by side relationship within said camera box;
  a first lens associated with said first chamber;
  a second lens associated with said second chamber;
  a first shutter associated with said first lens and having first adjustment means and first means operatively connected to said adjustment means of said first shutter;
  a second shutter associated with said second lens and having second adjustment means and second means operatively connected to said adjustment means of said second shutter;
  said first and second means being disposed to be readily accessible to an operator of said camera;
  a first cable release mechanism associated with said first shutter, and a first cable operatively connected, at one end thereof, with said first release mechanism;
  a second cable release mechanism associated with said second shutter, and a second cable operatively connected, at one end thereof, with said second release mechanism;
  said first and second cables being connected, at the other ends thereof, to a single, common switch means;
  whereby said first and second shutters can be opened and shut together and at the same time;
  a front wall having an aperture therein in line with said first lens;
  a back wall including means for mounting said instant film thereat;
  a top wall and a bottom wall;
  an extension housing extending outwardly from a side wall of said camera box and adjacent to an aperture therein;
  said housing comprising;
  a top wall extending at an angle to and downwardly with respect to the top wall of said camera box;
  an aperture at the bottom surface of said housing;
  a mirror on the inner surface of said top wall of said housing; and
  a second mirror disposed in said camera box adjacent said second chamber and positioned to receive reflections from said first mirror and to direct them to said second lens.

2. The camera box as defined in claim 1 wherein the top wall of said housing extends at an angle of 45 degrees to the top wall of said box;

and wherein said second mirror is disposed between said second chamber and said front wall at an angle of 45 degrees to said second wall.

3. The camera box as defined in claim 2 wherein said first and second means comprise lever means and said lever means and said switch means are disposed outside of said camera box.

4. The camera box as defined in claim 3 wherein said front and back walls and said first and second lenses are disposed in parallel planes.

5. A camera box as defined in claim 4 wherein the adjustment means of said first and second shutters comprise means for adjusting the shutter speed.

6. A camera box as defined in claim 4 wherein the adjustment means of said first and second shutters comprise means for adjusting the f openings of each said shutter.

7. In a system for simultaneously photographically reproducing, on instant film the images of two separate objects, a camera box comprising;
a first side wall, a second side wall and a separating wall between said first and second side walls;
a top wall and a bottom wall;
said separating wall, a portion of said first side wall, a first portion of said top wall and a first portion of said bottom wall defining a first chamber within said camera box;
said separating wall, a portion of said second side wall, a second portion of said top wall and a second portion of said bottom wall defining a second chamber within said camera box;
a first lens associated with said first chamber;
a second lens associated with said second chamber;
a first shutter associated with said first lens and having first adjustment means and first means operatively connected to said adjustment means of said first shutter;
a second shutter associated with said second lens and having second adjustment means and second means operatively connected to said adjustment means of said second shutter;
said first and second means being disposed to be readily accessible to an operator of said camera;
a first cable release mechanism associated with said first shutter, and a first cable operatively connected, at one end thereof, with said first release mechanism;
a second cable release mechanism associated with said second shutter, and a second cable operatively connected, at one end thereof, with said second release mechanism;
said first and second cables being connected, at the other ends thereof, to a single, common switch means;
whereby said first and second shutters can be opened and shut together and at the same time;
a front wall having an aperture therein in line with said first lens;
a back wall including means for mounting said instant film thereat;
an extension housing extending outwardly from said second side wall and adjacent to an aperture therein;
said housing comprising;
a top wall extending at an angle to and downwardly with respect to the top wall of said camera box;
an aperture at the bottom surface of said housing;
and a mirror on the inner surface of said top wall of said housing; and
a second mirror disposed in said camera box adjacent said second chamber and positioned to receive reflections from said first mirror and to direct them to said second lens.

8. The camera box as defined in claim 7 wherein the top wall of said housing extends at an angle of 45 degrees to the top wall of said box;
and wherein said second mirror is disposed between said second chamber and said front wall at an angle of 45 degrees to said second wall.

9. The camera box as defined in claim 8 wherein said first and second means comprise lever means and said lever means and said switch means are disposed outside of said camera box.

10. The camera box as defined in claim 9 wherein said front and back walls and said first and second lenses are disposed in parallel planes.

11. A camera box as defined in claim 10 wherein the adjustment means of said first and second shutters comprise means for adjusting the shutter speed.

12. A camera box as defined in claim 10 wherein the adjustment means of said first and second shutters comprise means for adjusting the f openings of each said shutter.

13. A system for simultaneously photographically reproducing on instant film, the images of two separate objects comprising;
a frame including a base and an elongated member extending vertically upwardly from said base;
a camera box mounted on said elongated member above said base;
said camera box comprising;
a first lens associated with said first chamber;
a second lens associated with said second chamber;
a first shutter associated with said first lens and having first adjustment means and first means operatively connected to said adjustment means of said first shutter;
a second shutter associated with said second lens and having second adjustment means and second means operatively connected to said adjustment means of said second shutter;
said first and second means being disposed to be readily accessible to an operator of said camera;
an extension housing extending outwardly from a side wall of said camera box and adjacent to an aperture in said side wall, said housing being disposed directly over and in line with a portion of said base;
a first cable release mechanism associated with said first shutter, and a first cable operatively connected, at one end thereof, with said first release mechanism;
a second cable release mechanism associated with said second shutter, and a second cable operatively connected, at one end thereof, with said second release mechanism;
said first and second cables being connected, at the other ends thereof, to a single, common switch means;
whereby said first and second shutters can be opened and shut together and at the same time;
a front wall having an aperture therein in line with said first lens;
a back wall including means for mounting said instant film thereat;

a top wall extending at an angle to and downwardly with respect to the top wall of said camera box;

an aperture at the bottom surface of said housing;

and a mirror on the inner surface of said top wall of said housing; and a second mirror disposed in said camera box adjacent said second chamber and positioned to receive reflections from said first mirror and to direct them to said second lens.

14. The system as defined in claim 13 wherein the top wall of said housing extends at an angle of 45 degrees to the top wall of said box;

and wherein said second mirror is disposed between said second chamber and said front wall at an angle of 45 degrees to said second wall.

15. The system as defined in claim 14 wherein said first and second means comprise lever means and said lever means and said switch means are disposed outside of said camera box.

16. The system as defined in claim 15 wherein said front and back walls and said first and second lenses are disposed in parallel planes.

17. A system as defined in claim 16 wherein the adjustment means of said first and second shutters comprise means for adjusting the shutter speed.

18. A system as defined in claim 16 wherein the adjustment means of said first and second shutters comprise means for adjusting the f openings of each said shutter.

19. A system for simultaneously photographically reproducing, on an instant film, the images of two separate objects comprising;

a frame including a base and an elongated member extending upwardly from said base;

a camera box mounted on said elongated member above said base;

said camera box comprising;

a first side wall, a second side wall and a separating wall between said first and second side walls;

a top wall and a bottom wall;

said separating wall, a portion of said first side wall, a first portion of said top wall and a first portion of said bottom wall defining a first chamber within said camera box;

said separating wall, a portion of said second side wall, a second portion of said top wall and a second portion of said bottom wall defining a second chamber within said camera box;

a first lens associated with said first chamber;

a second lens associated with said second chamber;

a first shutter associated with said first lens and having first adjustment means and first means operatively connected to said adjustment means of said first shutter;

a second shutter associated with said second lens and having second adjustment means and second means operatively connected to said adjustment means of said second shutter;

said first and second means being disposed to be readily accessible to an operator of said camera;

an extension housing extending outwardly from a side wall of said camera box and adjacent to an aperture in said side wall, said housing being disposed directly over and in line with a portion of said base;

a first cable release mechanism associated with said first shutter, and a first cable operatively connected, at one end thereof, with said first release mechanism;

a second cable release mechanism associated with said second shutter, and a second cable operatively connected, at one end thereof, with said second release mechanism;

said first and second cables being connected, at the other ends thereof, to a single, common switch means;

whereby said first and second shutters can be opened and shut together and at the same time;

a front wall having an aperture therein in line with said first lens;

a back wall including means for mounting said instant film thereat;

a top wall extending at an angle to and downwardly with respect to the top wall of said camera box;

an aperture at the bottom surface of said housing;

and a mirror on the inner surface of said top wall of said housing; and a second mirror disposed in said camera box adjacent said second chamber and positioned to receive reflections from said first mirror and to direct them to said second lens.

20. The system as defined in claim 19 wherein the top wall of said housing extends at an angle of 45 degrees to the top wall of said box;

and wherein said second mirror is disposed between said second chamber and said front wall at an angle of 45 degrees to said second wall.

21. The system as defined in claim 20 wherein said first and second means comprise lever means and said lever means and said switch means are disposed outside of said camera box.

22. The system as defined in claim 21 wherein said front and back walls and said first and second lenses are disposed in parallel planes.

23. A system as defined in claim 22 wherein the adjustment means of said first and second shutters comprise means for adjusting the shutter speed.

24. A system as defined in claim 22 wherein the adjustment means of said first and second shutters comprise means for adjusting the f openings of each said shutter.

* * * * *